(12) United States Patent
Slater et al.

(10) Patent No.: US 12,375,163 B2
(45) Date of Patent: Jul. 29, 2025

(54) IN-TRANSPORT MULTI-CHANNEL MEDIA DELIVERY

(71) Applicant: VIASAT, INC., Carlsbad, CA (US)

(72) Inventors: Joshua G. Slater, Rancho Mission, CA (US); Joshua J. Righetti, Carlsbad, CA (US); Nirmalkumar Velayudhan, San Marcos, CA (US)

(73) Assignee: VIASAT INC., Carlsbad, CA (US)

( * ) Notice: Subject to any disclaimer, the term of this patent is extended or adjusted under 35 U.S.C. 154(b) by 133 days.

(21) Appl. No.: 17/675,911

(22) Filed: Feb. 18, 2022

(65) Prior Publication Data

US 2022/0174330 A1 Jun. 2, 2022

Related U.S. Application Data

(63) Continuation of application No. 16/902,156, filed on Jun. 15, 2020, now Pat. No. 11,303,937, which is a
(Continued)

(51) Int. Cl.
*H04B 7/185* (2006.01)
*H04L 43/10* (2022.01)
(Continued)

(52) U.S. Cl.
CPC ......... *H04B 7/18508* (2013.01); *H04L 43/10* (2013.01); *H04L 65/60* (2013.01);
(Continued)

(58) Field of Classification Search
CPC ..... H04N 21/2146; H04L 67/01; H04L 43/10; H04L 65/60; H04L 67/10; H04B 7/18508; H04W 28/06; H04W 84/005
(Continued)

(56) References Cited

U.S. PATENT DOCUMENTS 2,629,538 A 2/1953 Replogle
4,688,110 A 8/1987 Fricke
(Continued)

FOREIGN PATENT DOCUMENTS

EP 1429518 A2 6/2004
EP 2071846 A1 6/2009
EP 2629538 A1 8/2013

OTHER PUBLICATIONS

Suman Kalyan Mandal et al., Intelligent pre-fetching to reduce channel switching delay in IPTV systems. Technical report, Department of Computer Science, Texas A & M University, 2008 (Year: 2008).*

(Continued)

*Primary Examiner* — Alfonso Castro
(74) *Attorney, Agent, or Firm* — HOLZER PATEL DRENNAN

(57) ABSTRACT

Embodiments provide efficient delivery of multiple media channels to in-transport terminals, for example, to reduce channel zapping delay in a bandwidth efficient manner. For example, an in-transport media (ITM) server can distribute multiple channel offerings to ITM clients in a transport craft. Meanwhile, the ITM server can monitor which channel offerings are presently being consumed via the ITM clients, and can transmit feedback to a remote media server, accordingly. Based on the feedback, the ITM server can receive the channel offerings from the remote media server, in such a way that one or more of the channel offerings is received as a low-fidelity instance when not presently being consumed via any of the ITM clients, and one or more of the channel offerings is received as a high-fidelity instance when presently being consumed via at least one of the ITM clients.

16 Claims, 6 Drawing Sheets

Related U.S. Application Data continuation of application No. 15/628,853, filed on Jun. 21, 2017, now Pat. No. 10,721,498, which is a continuation of application No. 14/792,827, filed on Jul. 7, 2015, now Pat. No. 9,716,735.

(60) Provisional application No. 62/117,845, filed on Feb. 18, 2015.

(51) Int. Cl.
| | |
|---|---|
| H04L 65/60 | (2022.01) |
| H04L 67/01 | (2022.01) |
| H04L 67/10 | (2022.01) |
| H04N 21/214 | (2011.01) |
| H04W 28/06 | (2009.01) |
| H04W 84/00 | (2009.01) |

(52) U.S. Cl.
CPC .............. *H04L 67/01* (2022.05); *H04L 67/10* (2013.01); *H04N 21/2146* (2013.01); *H04W 28/06* (2013.01); *H04W 84/005* (2013.01)

(58) Field of Classification Search
USPC .......................................................... 725/77
See application file for complete search history.

(56) References Cited

U.S. PATENT DOCUMENTS

| | | | |
|---|---|---|---|
| 6,760,757 | B1 | 7/2004 | Lundberg et al. |
| 6,810,527 | B1 | 10/2004 | Conrad et al. |
| 6,934,752 | B1 | 8/2005 | Gubbi |
| 7,100,187 | B2 | 8/2006 | Pierzga et al. |
| 7,113,780 | B2 | 9/2006 | McKenna et al. |
| 7,249,951 | B2 | 7/2007 | Bevirt et al. |
| 7,600,248 | B1* | 10/2009 | Berry ................... H04N 21/472 |
| | | | 725/77 |
| 7,839,926 | B1 | 11/2010 | Metzger et al. |
| 8,037,500 | B2 | 10/2011 | Margis et al. |
| 8,151,301 | B2 | 4/2012 | Bennett |
| 8,291,462 | B2 | 10/2012 | Lee et al. |
| 8,316,082 | B2 | 11/2012 | Igarashi |
| 8,341,672 | B2 | 12/2012 | Civanlar et al. |
| 8,429,687 | B2 | 4/2013 | Civanlar et al. |
| 8,584,256 | B2 | 11/2013 | Spooner et al. |
| 8,639,214 | B1 | 1/2014 | Fujisaki |
| 8,769,577 | B2 | 7/2014 | Smoyer et al. |
| 9,067,132 | B1 | 6/2015 | Bergeron |
| 9,118,973 | B1* | 8/2015 | Derderian .......... H04N 21/2146 |
| 9,369,991 | B2 | 6/2016 | Lauer et al. |
| 9,602,570 | B2 | 3/2017 | Macrae et al. |
| 9,716,735 | B2 | 7/2017 | Slater et al. |
| 9,967,020 | B2 | 5/2018 | Kanabar et al. |
| 2002/0094031 | A1 | 7/2002 | Ngai et al. |
| 2002/0120501 | A1 | 8/2002 | Bell et al. |
| 2003/0110503 | A1* | 6/2003 | Perkes ................... H04N 21/84 |
| | | | 348/E7.071 |
| 2003/0200279 | A1 | 10/2003 | Yoshimoto |
| 2003/0203734 | A1 | 10/2003 | Igloi et al. |
| 2003/0217363 | A1* | 11/2003 | Brady, Jr. ............. H04L 67/025 |
| | | | 348/E7.086 |
| 2004/0043770 | A1 | 3/2004 | Amit et al. |
| 2004/0133354 | A1 | 7/2004 | Low et al. |
| 2004/0205811 | A1 | 10/2004 | Grandy et al. |
| 2004/0220793 | A1 | 11/2004 | Hawkes et al. |
| 2005/0119976 | A1 | 6/2005 | Taylor et al. |
| 2006/0031557 | A1 | 2/2006 | Walsh et al. |
| 2006/0048196 | A1 | 3/2006 | Yau |
| 2006/0141437 | A1 | 6/2006 | Wakamoto |
| 2006/0196164 | A1 | 9/2006 | Donohue |
| 2006/0253330 | A1 | 11/2006 | Maggio et al. |
| 2007/0011343 | A1 | 1/2007 | Davis et al. |
| 2007/0124150 | A1 | 5/2007 | Sinai |
| 2007/0134641 | A1 | 6/2007 | Lieu |
| 2008/0071399 | A1 | 3/2008 | Baird |
| 2008/0225167 | A1 | 9/2008 | Beermann |
| 2008/0240061 | A1 | 10/2008 | Lynch et al. |
| 2008/0307457 | A1 | 12/2008 | Yang et al. |
| 2009/0049485 | A1* | 2/2009 | Agrawal ................ H04N 7/108 |
| | | | 725/87 |
| 2009/0055540 | A1 | 2/2009 | Foti et al. |
| 2009/0070841 | A1 | 3/2009 | Buga et al. |
| 2009/0076669 | A1 | 3/2009 | Krishnaswamy et al. |
| 2009/0192870 | A1 | 7/2009 | White et al. |
| 2009/0228908 | A1* | 9/2009 | Margis ............... H04N 21/4408 |
| | | | 725/6 |
| 2009/0269025 | A1 | 10/2009 | Bedingfield et al. |
| 2010/0088575 | A1 | 4/2010 | Sharon et al. |
| 2010/0114642 | A1 | 5/2010 | Dufosse et al. |
| 2010/0138864 | A1 | 6/2010 | Yoakum |
| 2010/0158109 | A1 | 6/2010 | Dahlby et al. |
| 2010/0162327 | A1 | 6/2010 | Bonar |
| 2010/0251296 | A1* | 9/2010 | Kim .......................... H04N 5/50 |
| | | | 725/38 |
| 2011/0004901 | A1* | 1/2011 | Schultz .................. H04H 20/62 |
| | | | 725/39 |
| 2011/0029998 | A1 | 2/2011 | Yip |
| 2011/0167447 | A1 | 7/2011 | Wong |
| 2011/0176060 | A1 | 7/2011 | Lee et al. |
| 2011/0274202 | A1 | 11/2011 | Jeong et al. |
| 2011/0320560 | A1 | 12/2011 | Bennett et al. |
| 2012/0131619 | A1 | 5/2012 | Ogilvie |
| 2013/0083778 | A1 | 4/2013 | Wang |
| 2013/0095874 | A1 | 4/2013 | Moshfeghi |
| 2013/0125153 | A1 | 5/2013 | Hilson et al. |
| 2013/0194996 | A1 | 8/2013 | Oyman |
| 2013/0205340 | A1* | 8/2013 | Stahl ..................... H04W 48/04 |
| | | | 725/39 |
| 2013/0312020 | A1 | 11/2013 | Talbert |
| 2014/0006951 | A1 | 1/2014 | Hunter |
| 2014/0101236 | A1 | 4/2014 | Dietrich et al. |
| 2014/0226983 | A1 | 8/2014 | Vargas |
| 2014/0282747 | A1 | 9/2014 | Richman et al. |
| 2014/0337887 | A1 | 11/2014 | Kim |
| 2014/0373057 | A1* | 12/2014 | Hoffert ............... H04N 21/4312 |
| | | | 725/100 |
| 2015/0049253 | A1 | 2/2015 | Persson et al. |
| 2015/0106458 | A1 | 4/2015 | Marovets |
| 2015/0220216 | A1 | 8/2015 | Wigdor et al. |
| 2016/0065637 | A1 | 3/2016 | O'Malley |
| 2016/0119052 | A1* | 4/2016 | Frerking ............... H04W 24/02 |
| | | | 455/431 |
| 2016/0119938 | A1 | 4/2016 | Frerking et al. |
| 2017/0085328 | A1* | 3/2017 | Dickemann, Jr. ...... H04H 20/02 |

OTHER PUBLICATIONS

International Search Report and Written Opinion for PCT/US2016/017760, mailed on Feb. 6, 2016, in 10 pages.
Merriam-Webster, "fidelity", 2017.
Microsoft Computer Dictionary, "feedback", 5th Edition, 2002, 209.
Microsoft Computer Dictionary, "HDTV-over-IP", 2nd Edition, 2002, 248.
Microsoft Computer Dictionary, "real time", 2002, 441.
Wikipedia, "High Fidelity (disambiguation)", 2017.
Wikipedia, "Low Fidelity", 2017.
Wikipedia, "High-definition television", 2020.
Al-Shaer, E. , et al., "HiFi: a new monitoring architecture for distributed systems management", Proceedings. 19th IEEE International Conference on Distributed Computing Systems (Cat. No. 99CB37003), 1999, 171-178.
Angermann , et al., "Apparatus and method for improved access to data and information services", EP1429518A2, Google printout version, 2004.
Egger, F.N. , "Lo-Fi vs. Hi-Fi Prototyping: how real does the real thing have to be?", Teaching hci workshop, ozchi, 2000.
Jennehang, Ulf , "Bandwidth Efficient IPTV Distribution—On Error Resilience and Fast Channel Change", Department of Information Technology and Media Mid Sweden University, Doctoral Thesis No. 39, Sundsvall, Sweden; 127 pages., 2007.

(56) References Cited

OTHER PUBLICATIONS

Kim, Allen, "Internet-centric solution is more than moving online", Sexology, 2015, 1-2.

Kindborg, M., "How children understand concurrent comics: experiences from LOFI and HIFI prototypes", Proceedings IEEE Symposia on Human-Centric Computing Languages and Environments, 2001.

Mandal, Suman Kalyan, "Intelligent Pre-fetching to Reduce Channel 1 Switching Delay in IPTV Systems", Texas A&M, 2008, 1-6.

Martin, D., "'High-fidelity' in musical tone production?", Transactions of the IRE Professional Group on Audio ( vol. AU-2, Issue: 4, Jul.-Aug. 1954, 102-104.

Munshi, Fadi, et al., "Low- versus high-fidelity simulations in teaching and assessing clinical skills", Journal of Taibah University Medical Sciences, vol. 10, Issue 1, Mar. 2015, 12-15.

Zhang, Yu, et al., "A Lifetime Maximization Relay Selection Scheme in Wireless Body Area Networks", Sensors, 17 (6), 1267, Jun. 2, 2017.

U.S. Appl. No. 14/792,827, filed Jul. 7, 2015.
U.S. Appl. No. 15/628,853, filed Jun. 21, 2017.
U.S. Appl. No. 16/902,156, filed Jun. 15, 2020.

\* cited by examiner

IN-TRANSPORT MULTI-CHANNEL MEDIA DELIVERY

CROSS-REFERENCE TO RELATED APPLICATIONS

This application is a continuation of U.S. application Ser. No. 16/902,156, filed on Jun. 15, 2020, entitled "In-Transport Multi-Channel Media Delivery", which is a continuation of U.S. patent application Ser. No. 15/628,853, filed 21 Jun. 2017, entitled "In-Transport Multi-Channel Media Delivery", which is a continuation of U.S. application Ser. No. 14/792,827 filed on 7 Jul. 2015, entitled "In-Transport Multi-Channel Media Delivery", which is a non-provisional of, and claims priority to U.S. Provisional Patent Application No. 62/117,845, titled, "Efficient IPTV Transmission Over Satellite With Watched Channel Feed Back and Low Rate Channel Preview," filed 18 Feb. 2015, each which are incorporated herein by reference.

FIELD

Embodiments relate generally to satellite communications systems, and, more particularly, to providing efficient delivery of multiple media channels to in-transport terminals.

BACKGROUND

In-flight entertainment technology traditionally includes storage of digital media in on-aircraft servers that is provided to passengers on airplanes through shared (e.g., ceiling-mounted) and/or personal (e.g., seat-back) terminals. Some carriers desire to provide their passengers with online streaming media access (e.g., received from the Internet or another content sources over one or more networks, as opposed to from on-aircraft storage), which can involve maintaining a communications link between the aircraft and media servers over a communications network. Providing higher quality media and larger numbers of options can place increasing demands on the resources of those communications links. For example, some aircraft include a satellite antenna that enables the aircraft to communicate with a satellite communications system while in flight. Because the communications links are typically capacity limited (or only a portion of the capacity is reserved for such in-flight media), it can be generally impractical or undesirable for all aircraft to receive all possible media options at all times.

This can sometimes manifest as a sub-optimal media consumption experience for passengers. For example, some airlines offer either an "on-demand" type of interface (e.g., the passenger selects content or a channel from a listing of options, presses play, and waits for the new media stream to begin), or a "television" type of interface (e.g., passengers can scroll through channel offerings by incrementing or decrementing a channel selector). The media provided by such approaches may be provided by remote sources received over the communications link. In this case, passengers may see appreciable delay when changing channels ("channel zapping") due to the time it takes to set up new channels on-demand in response to channel requests from passengers, etc. One technique for addressing the channel zapping delay is to transmit all channel options via the communication link throughout the flight (at least during the portion of the flight when media consumption is permitted), regardless of which channels are being watched. However, because of capacity constraints of the communication link, such an approach tends to provide very limited numbers of channels.

BRIEF SUMMARY

Among other things, systems and methods are described for providing efficient delivery of multiple media channels to in-transport terminals. For example, embodiments seek to improve the media consumption experience of transport craft passengers (e.g., passengers on airplanes, trains, cruise ships, buses, etc.) by reducing the delays experienced during channel "zapping" in a bandwidth-efficient manner. In one embodiment, an in-transport media (ITM) server can distribute multiple channel offerings (at least some of which provide linearly programmed audio and/or video content) to multiple ITM clients (e.g., seatback terminals, personal media consumption devices, etc.) in the transport craft. While distributing the channel offerings, the ITM server can monitor which, if any, of the channel offerings are presently being consumed via the ITM clients. The ITM server can communicate feedback to a remote media server indicating which of the channel offerings is/are presently being consumed according to the monitoring.

Based on the feedback, the ITM server can receive the channel offerings from the remote media server, in such a way that one or more of the channel offerings is received as a low-fidelity instance when not presently being consumed via any of the ITM clients (i.e., when no ITM clients are presently consuming the channel offering), and one or more of the channel offerings is received as a high-fidelity instance when presently being consumed via at least one of the ITM clients. For example, at a given time, any media channels being consumed by any of the passengers are delivered to the aircraft as respective high-fidelity instances, while media channels not being consumed by any of the passengers are delivered to the aircraft as low-fidelity instances. During channel zapping, a passenger can effectively channel zap without delay between channels by browsing through a combination of high-fidelity and low-fidelity instances (depending on what is presently being consumed by other passengers).

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1:
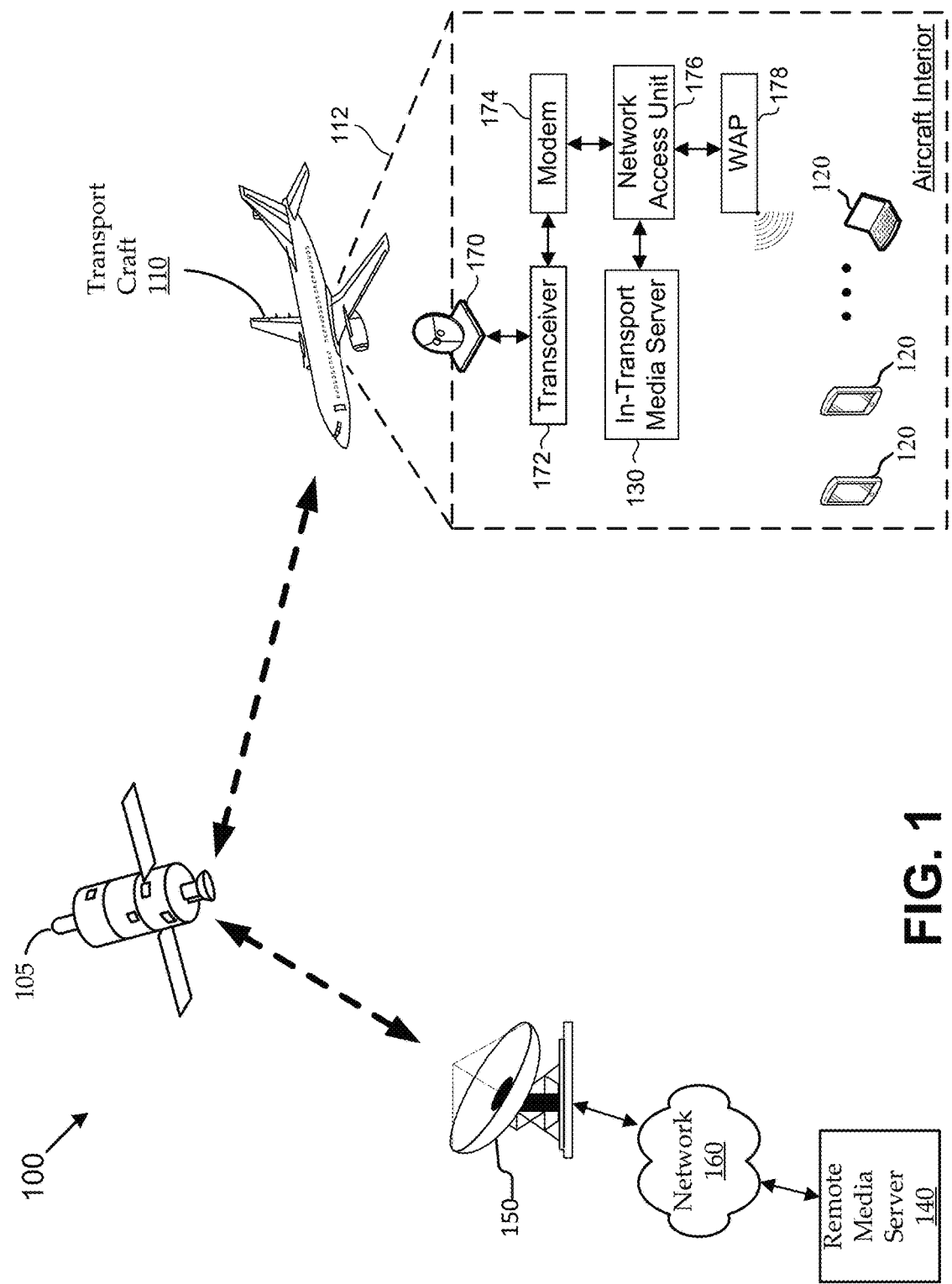
FIG. 1 shows a simplified diagram of a satellite communications system, which provides a context for various embodiments.

FIG. 1 shows a simplified diagram of a satellite communications system 100, which provides a context for various embodiments. May other configurations are possible having more or fewer components than the satellite communications system 100 of FIG. 1. In the illustrated embodiment, the satellite communications system 100 includes a transport craft 110 in communication with a remote media server 140 via a satellite 105, a gateway 150, and a network 160. The transport craft 110 can include a two-way communication system 112 to facilitate bidirectional communication with the satellite 105. In the illustrated embodiment, the two-way communication system includes an antenna system 170, transceiver 172, modem 174, network access unit 176, wireless access point (WAP) 176, and in-transport media server 130.

The two-way communication system 112 can provide for reception of a forward downlink signal from the satellite 105 and transmission of a return uplink signal to the satellite 105 to support two-way data communications between in-transport media clients 120 within the transport craft 110 and the remote media server 140. The in-transport media clients 120 can include mobile devices (e.g., smartphones, laptops, tablets, netbooks, and the like) such as personal electronic devices (PEDs) brought onto the transport craft 110 by passengers. As further examples, the in-transport media clients 120 can include passenger seat back systems or other devices on the transport craft 110. The in-transport media clients 120 can communicate with the network access unit 176 via a communication link that can be wired and/or wireless. The communication link can be, for example, part of a local area network such as a wireless local area network (WLAN) support by WAP 178. One or more WAPs 178 can be distributed about the transport craft 110, and can, in conjunction with network access unit 176, provide traffic switching and routing functionality; for example, as part of a WLAN extended service set (ESS), etc.

In operation, the network access unit 176 can provide uplink data received from the in-transport media clients 120 to the modem 174 to generate modulated uplink data (e.g., a transmit intermediate frequency (IF) signal) for delivery to the transceiver 172. The transceiver 172 can upconvert and then amplify the modulated uplink data to generate the return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 176 for routing to the in-transport media clients 120. The modem 174 can be integrated with the network access unit 176, or can be a separate component in some examples.

As described in more detail below, the in-transport media server 130 can provide commands to the network access unit 176 to manage and distribute media channel offerings from the remote media server 140 to the in-transport media clients 120 using the techniques described herein. The in-transport media server 130 can provide for on-board media distribution and can include one or more media servers, media storage devices, etc. The functions of the in-transport media server 130 can be implemented in hardware, instructions embodied in memory and formatted to be executed by one or more general or application-specific processors, firmware, or any combination thereof. In the illustrated embodiment, the in-transport media server 130 is shown as a separate device. Alternatively, some or all of the components or features of the in-transport media server 130 can be implemented within one or more other components of the two-way communication system 112. The network access unit 176 can also allow the in-transport media clients 120 to access one or more additional servers (not shown) local to the transport craft 110, such as a server storing media channels that provide in-flight entertainment. In some implementations (and/or some scenarios) reference herein to the in-transport media clients 120 on the transport craft 110 provided with media channels using the techniques described herein for reducing channel zapping delay in a bandwidth efficient manner, can include only a portion of the in-transport media clients 120 that are actually on the transport craft 110 at a particular time. For example, not all in-transport media clients 120 may be consuming media, consuming media from the in-transport media server 130 using the techniques described herein, consuming the type of linear media invoked by some embodiments herein, etc.

In the illustrated embodiment, the transport craft 110 is an airplane. Alternatively, the transport craft 110 may be other than an airplane, such as a train, bus, cruise ship, etc. As illustrated, media can be obtained from the remote media server 140 via network 160 and gateway 150 (and/or other ground terminals or other network nodes). The network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

The remote media server 140 can be accessible via the satellite 105 in any suitable architecture. For example, linear programming (e.g., audio and/or video media) can be generated by the remote media server 140, stored at the remote media server 140, and/or received by the remote media server 140 via network 160; and the remote media server 140 may be located at the gateway 150, core node, or any other suitable location of the communications infrastructure. The linear programming can be communicated from the remote media server 140 to the in-transport media clients 120 (e.g., in response to requests for such media from the in-transport media clients 120), while in flight, via the satellite 105 and the in-transport media server 130. Although only one remote media server 140 is shown to avoid over complication of the drawing, the media channels received by the in-transport media clients 120 may be from one or more remote media servers 140.

In embodiments described herein, multiple media channels are offered, and that at least some of those channels provide linear programming being received by the transport craft 110 via the satellite 105. For example, one or more additional channels can be offered to provide locally sourced media (e.g., from on-craft servers, etc.), non-linear programming (e.g., video on demand, etc.), and or other types of media. As used herein, "linear programming" generally refers to any stream of content that is scheduled for delivery at a certain time (e.g. a television show run at a set time, live event, etc.). For example, by selecting a "channel," a user effectively elects to consume whatever scheduled media is playing on that channel at that time; as opposed to directly selecting the media content itself.

While a single airplane is shown in communication via a single satellite, techniques described herein can be applied in many other communications environments without departing from the scope of the inventions. For example, one or more transport craft(s) 110 can include airplanes, trains, buses, cruise ships, etc.; and any or all such transport craft(s) 110 can communicate via any one or more suitable communications architecture(s) including any suitable communications links, such as satellite communications systems, air-to-ground communication systems, hybrid satellite and air-to-ground communications systems, cellular communications systems, etc. Typically, because of the mobile nature of the transport craft 110, the communications architecture will likely involve at least one wireless communications link.

Increasingly, in context of transport craft 110, carriers desire to provide their passengers with more access to content, which can include providing access from sources remote to the transport craft 110 (e.g., from the Internet and/or other remote sources, as opposed to from on-craft storage). This can involve maintaining one or more communications links between the transport craft 110 and one or more remote media servers 140 over a communications network (e.g., via the satellite 105). There is typically a further desire to provide an increasing variety of media options to passengers and often at a quality (e.g., resolution, color depth, etc.) that has increased over time. For example, personal electronic devices with high-fidelity displays are increasingly ubiquitous among passengers. While it may be ideal for the transport craft 110 to receive all the desired media options at a highest desired fidelity at all times during transport, this is typically impractical. Providing a larger variety of higher quality media options can place increasing demands on limited resources of the communications links servicing the transport craft 110. For example, communications links can be bandwidth-limited. Further constraints can also be placed on the links by virtue of their context in the communications network. For example, if an airplane is communicating with a satellite via a particular spot beam (e.g., using a particular carrier frequency, polarization, etc.), the capacity of the link can be impacted by how many other users are being serviced by the spot beam (e.g., including other airplanes and/or other transport craft 110, mobile user terminals, fixed user terminals, etc.), weather (e.g., rain fade, etc. can cause packet loss and/or other impacts), communications schemes (e.g., modulation and/or coding schemes, etc. can add overhead to the communications), etc. These and other constraints can effectively limit the available bandwidth at any given time, which can limit the number of concurrent media channels that can be offered and/or limit the fidelity at which those media channels can be offered.

Different carriers tend to provide different types of media consumption interfaces to the in-transport media clients 120. One illustrative type of interface appears to passengers as an electronic program guide and a media player. A passenger can select one of a number of channel offerings by interacting with the electronic program guide portion of the interface; and the selected channel offering either begins to play automatically or appears in a playback portion of the interface (e.g., a video window) through which the passenger can manually begin playback (e.g., by interfacing with a play control). In either case, there can typically be an appreciable delay prior to playback, during which time the in-transport media client 120 joins the media stream (e.g., where the channel is not sent when it is not being watched). In such interfaces, there is typically no way for the passenger to quickly scroll through channel offerings to see what is currently paying on those channels. Another illustrative type of interface appears to passengers more like a traditional television display, or the like (e.g., without a separate electronic program guide). To change channels, a passenger can typically scroll up or down through the channels. Again, there can typically be an appreciable delay prior to commencing playback of the channel offering, which can create a sub-optimal channel zapping experience for passengers. Any of the above and/or other types of interfaces can manifest "channel zapping" (channel changing) delay to passengers, which can be detrimental to their media consumption experience.

Embodiments are described herein for providing efficient delivery of multiple media channel offerings to in-transport media clients 120 via an in-transport media server 130 of transport craft 110 in a manner that improves the media consumption experience of passengers when channel zapping, while maintaining a low bandwidth footprint on the communications link. Such embodiments can provide passengers with an intermediate channel experience to effectively hold the passengers over for the delay between the time they switch to a channel and the time when a high-fidelity instance of the channel is provided for consumption via the passenger's in-transport media client 120. For example, even if the intermediate channel experience is sub-optimal (i.e., lower fidelity), this can be preferable over the passenger experiencing a delay with no channel experience at all. For the sake of illustration, such embodiments can permit a passenger to quickly scroll through channels and to get an idea of what is on each channel, without having to pause for an appreciable delay at each channel while waiting for the stream to become available.

Embodiments can operate in context of a transport craft 110 carrier (e.g., an airline, etc.) desiring to provide its passengers, in transport, with multiple channels of media content that is (i) linearly programmed (i.e., passengers can "tune" into an existing broadcast, multicast, or other type of content stream, as opposed to requesting on-demand programming) and (ii) streamed (i.e., some or all of the content is being received over a communications link while it is being consumed). Further, embodiments can provide for passengers to channel zap without experiencing appreciable (or substantially any) delay when switching between channels. In general, embodiments of the in-transport media server 130 can monitor which channel offerings are presently being consumed via the in-transport media clients 120, and can transmit feedback to the remote media server 140, accordingly. The remote media server 140 can transmit instances of some or all the channel offerings, but in a manner that selectively includes high-fidelity and/or low-fidelity instances of the channel offerings in accordance with the feedback. For example, the in-transport media server 130 can receive the channel offerings from the remote media server 140, in such a way that one or more of the channel offerings is received as a low-fidelity instance when not presently being consumed via any of the in-transport media clients 120, and one or more of the channel offerings is received as a high-fidelity instance when presently being consumed via at least one of the in-transport media clients 120.

As used herein, "fidelity" (i.e., in context of "high-fidelity" or "low-fidelity") is intended to refer to any characteristic of perceived media content quality, such as bitrate, resolution, color depth, sharpness, etc. Further, the terms "high-fidelity" and "low-fidelity" are intended to be construed as relative terms, and not as referring to any absolute or predefined quality designation (e.g., "high-fidelity" is not intended to refer specifically to any high-fidelity ("hi-fi") audio or video standard). In one illustrative example, various broadcast television channel offerings are available from the remote media server 140 at the same or different respective quality levels, such that a "high-fidelity" instance of any of those channels could include video content at "240p," "360p," "720p," "1080p," etc. (note that, while these designations all refer to a respective number of horizontal rows of pixels, such is intended only as non-limiting examples of one type of quality designation). In each case, a respective low-fidelity instance of any of these channel offerings could include a relatively lower resolution, a similar resolution with lower color depth, output from a higher-compression codec, a lower frame rate, etc. The fidelity can refer to communication-related aspects (e.g., bitrate), display-related aspects (e.g., display resolution, color depth, etc.), etc. In one implementation, the low-fidelity instance is generated by forming periodic snapshot images of the video content (e.g., one to N times per second, one time per N seconds, etc.). Communicating such snapshot images as low-fidelity instances (e.g., of a presently unwatched channel) can consume appreciably less bandwidth on the communications link to the transport craft 110 that would communicating the respective high-fidelity instance of the same channel. In various embodiments, some or all high-fidelity instances can be implemented in the same or different manners across the channel offerings; and/or some or all low-fidelity instances can be implemented in the same or different manners across the channel offerings. Further, in various embodiments, high-fidelity and/or low-fidelity can be generated in a single, predetermined manner; in different manners depending on context (e.g., the extent to which the fidelity of the instance is "lowered" can be impacted by an amount of capacity constraint experienced in the network); in different manners for different channels (e.g., a lowest level of fidelity for one channel may be higher or lower than that of another channel, etc.; the fidelities may be generated differently, etc.); and/or in any other suitable manner. For example, for each channel offering, some implementations consider the high-fidelity instance as the highest fidelity available for that channel offering from the remote media server 140, and low-fidelity instances are generated by the remote media server 140 from those high-fidelity instances using one or more fidelity lowering techniques (e.g., down-converting, compressing, generating snapshot images, etc.).

Figure 2:
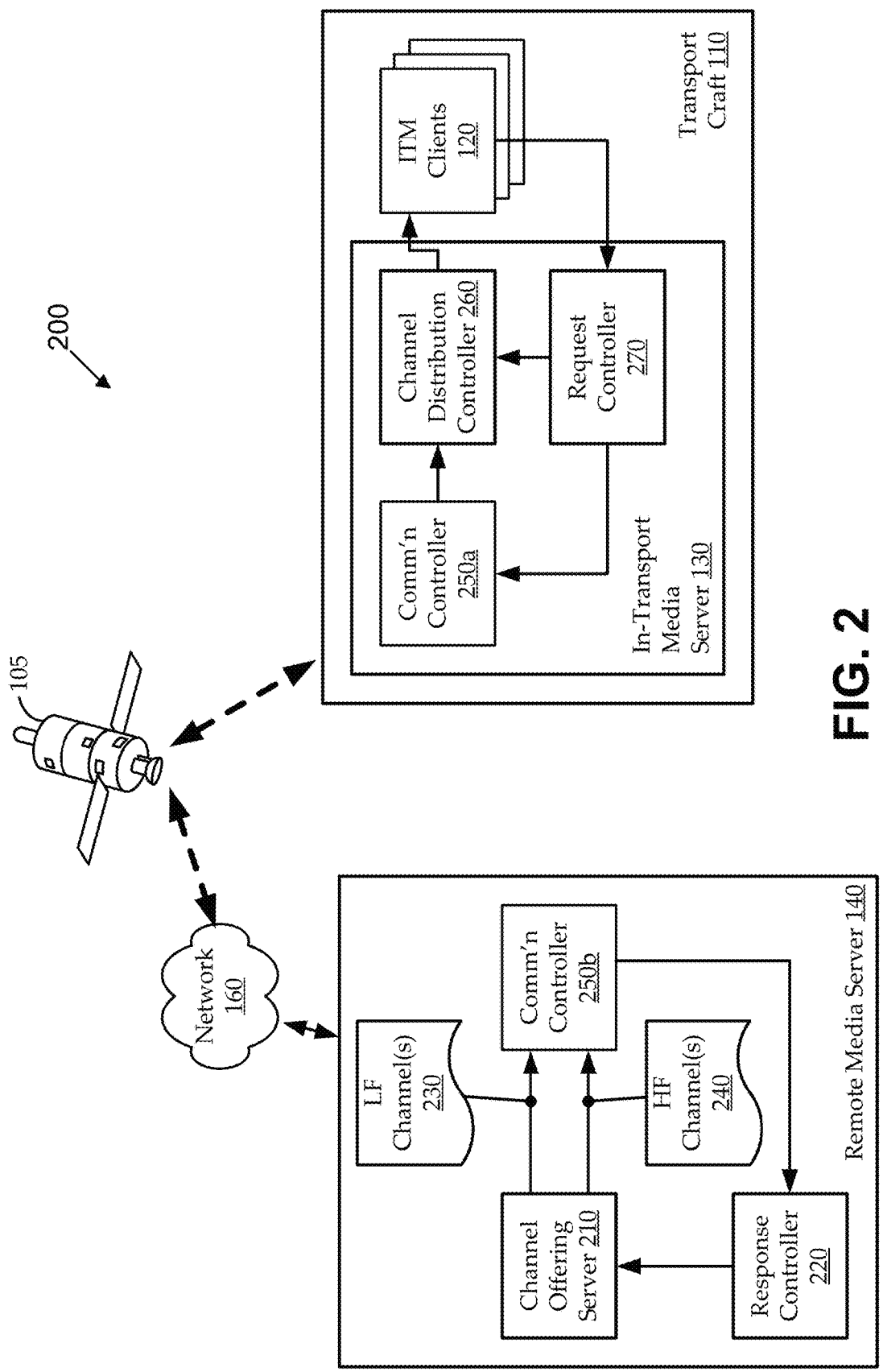
FIG. 2 shows a block diagram of an illustrative in-transport media delivery system, according to various embodiments.

FIG. 2 shows a block diagram of an illustrative in-transport media delivery system 200, according to various embodiments. Many other configurations are possible having more or fewer components. Moreover, the functionalities described herein can be distributed among the components in a different manner than described herein. Embodiments of the in-transport media delivery system 200 can be an implementation of components of the communications environment described with reference to FIG. 1. As illustrated, an in-transport media server 130 is in communication, via satellite 105 (or other suitable communications network, as described above) and other components of the two-way communication system 112 (not shown in FIG. 2), with a remote media server 140. In FIG. 2 and the following discussion, gateway 150 and some components (e.g., antenna system 170, transceiver 172, modem 174, network access unit 176, WAP 178) of the two-way communication system 112 discussed above with respect to FIG. 1 are omitted to avoid over complication of the drawing. The in-transport media server 130 is located in transport craft 110 and is in communication with multiple in-transport media clients 120 also in the transport craft 110. As used herein, describing the in-transport media server 130 and/or in-transport media clients 120 as "in" the transport craft 110 is intended broadly to include any suitable location of those components, so that the components move along with the transport craft 110. For example, a particular one or more in-transport media server 130 or in-transport media client 120 could, alternatively, be located in, on, coupled with, integrated into, and/or otherwise disposed in relation to the transport craft 110. The functions of the in-transport media server 130 can be implemented in hardware, instructions embodied in a memory and formatted to be executed by one or more general or application-specific processors, firmware, or any combination thereof.

Embodiments of the in-transport media server 130 can include a channel distribution controller 260, a request controller 270, and a craft-side communications controller 250a. The channel distribution controller 260 can distribute multiple media channel offerings (e.g., linearly programmed audio and/or video channels) to multiple in-transport media clients 120 communicatively coupled thereto in the transport craft 110. The request controller 270 can monitor the in-transport media clients 120 to determine which, if any, of the channel offerings are presently being consumed (e.g., which video channels are being watched, which audio channels are being listened to, etc.). The craft-side communications controller 250a can communicate feedback to the remote media server 140, informing the remote media server 140 of which channel offerings are presently being consumed. The feedback can be communicated in any suitable manner. For example, the feedback can indicate a consumption status for all channel offerings, a list of channel offerings presently being consumed by at least one in-transport media client 120, a list of channel offerings not presently being consumed by any in-transport media clients 120, etc. In another example, requests for channels made by the in-transport media server 130 to the remote media server 140 correspond to specific requests for channels being actively consumed by in-transport media clients 120, so that viewership feedback is implicit in the communications from the in-transport media server 130 to the remote media server 140. In some implementations, the feedback is communicated whenever there is a change in consumption status for a channels offering. For example, if a previously unwatched channel offering begins being watched by any in-transport media client 120, or a previously watched channel offering ceases being watched by all in-transport media clients 120 that were watching the channel offering, feedback can be communicated to the remote media server 140, accordingly. In some instances, as described further below, the feedback indicates additional information, such as characteristics of one or more in-transport media clients 120 presently consuming a particular channel offering. For example, the feedback can inform the remote media server 140 of the highest fidelity supported by any in-transport media clients 120 presently consuming a channel offering. Additional feedback can also be provided. For example, some implementations provide feedback to the remote media server 140 indicating a present link quality for the one or more links servicing the transport craft 110.

Determining when a channel offering is being consumed can be implemented in different ways according to different embodiments. In some embodiments, a channel offering is considered to be presently consumed when any of the in-transport media clients 120 is presently "tuned" to a channel listing in a media consumption interface associated with that channel offering; and a channel offering is considered not to be presently consumed when all of the in-transport media clients 120 are presently tuned away from the channel listing in the media consumption interface associated with that channel offering. Other embodiments can include dwell hysteresis. For example, a channel offering is only considered presently consumed after at least one in-transport media client 120 has "dwelled" (i.e., remained) on the respective channel listing for at least a predetermined dwell duration. For the sake of illustration, if a passenger quickly scrolls past a channel listing, its respective channel offering will not be considered as presently consumed. This can mitigate potential wasting of resources by activating channels that the passenger is not actually interested in watching (e.g., when they are quickly scrolled past). Additionally or alternatively, some embodiments can include a release hysteresis. For example, a channel offering is only considered not presently consumed after all in-transport media clients 120 have been tuned away from the respective channel listing for at least a predetermined release duration. For the sake of illustration, if a passenger briefly scrolls away from the channel listing, then scrolls back, the respective channel offering can remain considered as presently consumed. The predetermined dwell duration and/or release duration can be any suitable duration (e.g., 250 milliseconds). Further, the dwell and/or release duration can be the same in all cases, can depend on the type of in-transport media client 120 (e.g., different devices or interface types may be associated with different dwell times), for different channel offerings (e.g., audio only channels may be associated with a shorter dwell time, etc.), can differ from each other (i.e., the dwell duration can be different from the release duration), etc.

Embodiments of the remote media server 140 can include a channel offering server 210, a response controller 220, and a remote communications controller 250b. For example, the channel offering server 210 can generate media content (e.g., generate linear programming from stored content) and/or receive media content from one or more content servers (not shown) via the network 160 networks. As described above, the media content can be available in different formats, which can manifest as and/or enable different levels of quality. For each channel offering made available by the remote media server 140, embodiments of the channel offering server 210 can generate at least one high-fidelity instance 240 of the channel offering and at least one low-fidelity instance 230 of the channel offering. In general, the high-fidelity instances 240 are intended to be of a sufficient quality level to provide a desirable consumption experience for passengers (e.g., depending on the type of media, the type of consumption device, etc.); while the low-fidelity instances are intended to be of a quality level that is too low to provide a desirable long-term consumption experience for passengers. For example, as described above, some implementations generate some or all low-fidelity instances by generating snapshots (e.g., images, short audio and/or video clips, etc.) of the media content in a manner that takes appreciably less bandwidth to communicate. Other implementations can down-convert and/or apply one or more forms of compression to the audio and/or video, such as by reducing resolution, reducing color depth, reducing frame rate, removing enhancement layers, etc.

As described above, the request controller 270 can monitor the in-transport media clients 120 to determine which, if any, of the channel offerings are presently being consumed, and the craft-side communications controller 250a can communicate the feedback to the remote media server 140. The feedback can be received by the remote communications controller 250b and processed by the response controller 220, thereby informing the channel offering server 210 as to which instances of which channel offerings should be communicated to the transport craft 110. In some embodiments, the channel offering server 210 generates at least one high-fidelity instance 240 and at least one low-fidelity instance 230 for each channel offering, regardless of the feedback, and the feedback only impacts which instances are communicated to the transport craft 110. In other embodiments, the channel offering server 210 only generates high-fidelity instances 240 and/or low-fidelity instances 230 for each channel offering in accordance with the feedback. For example, if the feedback indicates that no in-transport media clients 120 are presently consuming a particular channel offering, the channel offering server 210 may only generate a low-fidelity instance 230 for that channel offering.

In response to, and in accordance with, the feedback, the remote communications controller 250b can communicate the high-fidelity instances 240 and/or low-fidelity instances 230 of the channel offerings over the communications network (e.g., via the satellite 105) to the transport craft 110. For example, the channel distribution controller 260 can receive the instances of the channel offerings (e.g., via the craft-side communications controller 250a from the remote communications controller 250b), such that one or more of the channel offerings is received as a low-fidelity instance when not presently being consumed via any of the ITM clients according to the feedback, and one or more of the channel offerings is received as a high-fidelity instance when presently being consumed via at least one of the ITM clients according to the feedback.

Notably, in some instances, one or more remote media servers 140 may be in communication with one or more transport crafts 110 over one or more communications links (e.g., one or more spot beams, etc.). Accordingly, in some embodiments determining whether to generate and/or communicate high-fidelity instances 240 and/or low-fidelity instances 230 of a particular channel offering can depend on aggregated feedback information. For example, a transport craft 110 in a spot beam of the satellite 105 may be able to receive content being multicast to any other terminals (e.g., other transport craft, fixed terminals, etc.) over the spot beam with little to no impact to the capacity of the spot beam. As such, in some instances, a channel offering may be received by the transport craft 110 as a high-fidelity instance 240 even when it is not presently being consumed by any in-transport media clients 120. As another example, a lower-fidelity instance 230 of a channel offering may be good enough for some types of in-transport media clients 120 and/or in some scenarios, so that it may not be desirable to treat a channel offering as presently consumed when it is only being consumed by such an in-transport media client 120 (i.e., in such a case, a high-fidelity instance 240 of the channel offering may not be communicated even though there is technically present consumption by at least one in-transport media client 120). In such a case, the decision of whether to treat a channel offering as presently consumed may be based on the characteristics (e.g. device type, display resolution, etc.) of the in-transport media client 120 consuming the channel offering. As yet another example, suppose one hundred channels of media are offered, but only channels 20-25 are presently being consumed. It may be desirable in some instances to communicate low-fidelity instances 230 of adjacent channels around those presently consumed channels (e.g., channels 10-19 and 26-35) to support channel zapping, but not to communicate any instances (i.e., neither low- nor high-fidelity) of the other channel offerings. As still another example, it can be desirable in some cases to communicate low-fidelity instances 230 of some or all channel offerings, regardless of whether a high-fidelity instance 240 is also being communicated. For example, it may be desired that, during channel zapping, passengers see the low-fidelity instances 230 for all channels, thereby getting a consistent experience independent of what other passengers are presently consuming. In some implementations, some or all of the low-fidelity channel instances are communicated over the network as a single dedicated stream of multiplexed low-fidelity channels.

Figure 3:
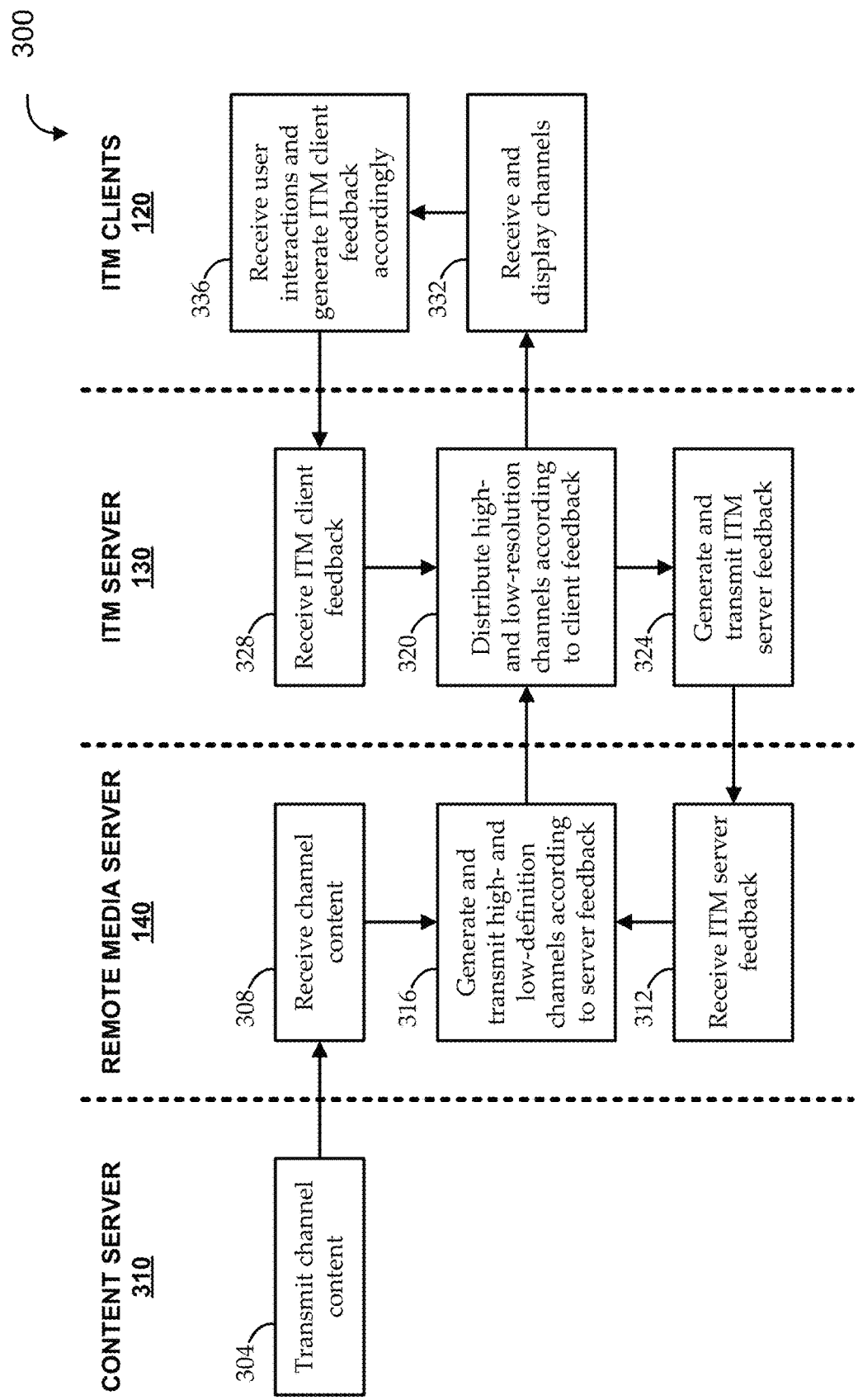
FIG. 3 shows a high-level flow diagram representing interactions among components of a communications environment, such as those described in FIGS. 1 and 2.

For the sake of illustration, FIG. 3 shows a high-level flow diagram 300 representing interactions among components of a communications environment, such as those described in FIGS. 1 and 2. The flow diagram 300 assumes that a number of in-transport media clients 120 are disposed in a transport craft and are in communication with an in-transport media server 130 also in the transport craft. The in-transport media server 130 is in communication with a remote media server 140 (e.g., over any suitable communications network), and the remote media server 140 is in communication with one or more content servers 310.

Passengers on the transport craft are assumed to be presently consuming one or more of a number of channel offerings through media consumption interfaces implemented on the in-transport media clients 120. For example, channels that are being actively consumed by one or more in-transport media clients 120 are being received and displayed by those in-transport media clients 120 (block 332) as high-fidelity instances (as described above, this may not always be the case). The in-transport media clients 120 also receive user interactions (e.g., channel change commands, etc.) and can generate "client feedback," accordingly (block 336). The client feedback can be received by the in-transport media server 130 (block 328), so that the in-transport media server 130 can effectively monitor which channel offerings are presently being consumed. Based on the received client feedback, the in-transport media server 130 can distribute appropriate instances of the channel offerings to the in-transport media clients 120 (e.g., based on which channel listing it is "tuned" to, based on the device capabilities, etc.) (block 320) and can generate and transmit "server feedback" to the remote media server 140 (block 324).

The remote media server 140 can receive the server feedback (block 312). Meanwhile, the one or more content servers 310 can transmit channel content to the remote media server 140 (block 304). The remote media server 140 can receive the channel content (block 308) and can generate and transmit high-fidelity and/or low-fidelity instances of channel offerings according to the received server feedback (block 316). The generated and communicated instances of the channel offerings can be received by the in-transport media server 130 and distributed to the in-transport media clients 120, effectively according to the client feedback (returning to block 320). Thus, the in-transport media server 130 can effectively aggregate the client feedback into server feedback to impact which instances are communicated for which channels.

Figure 4A:
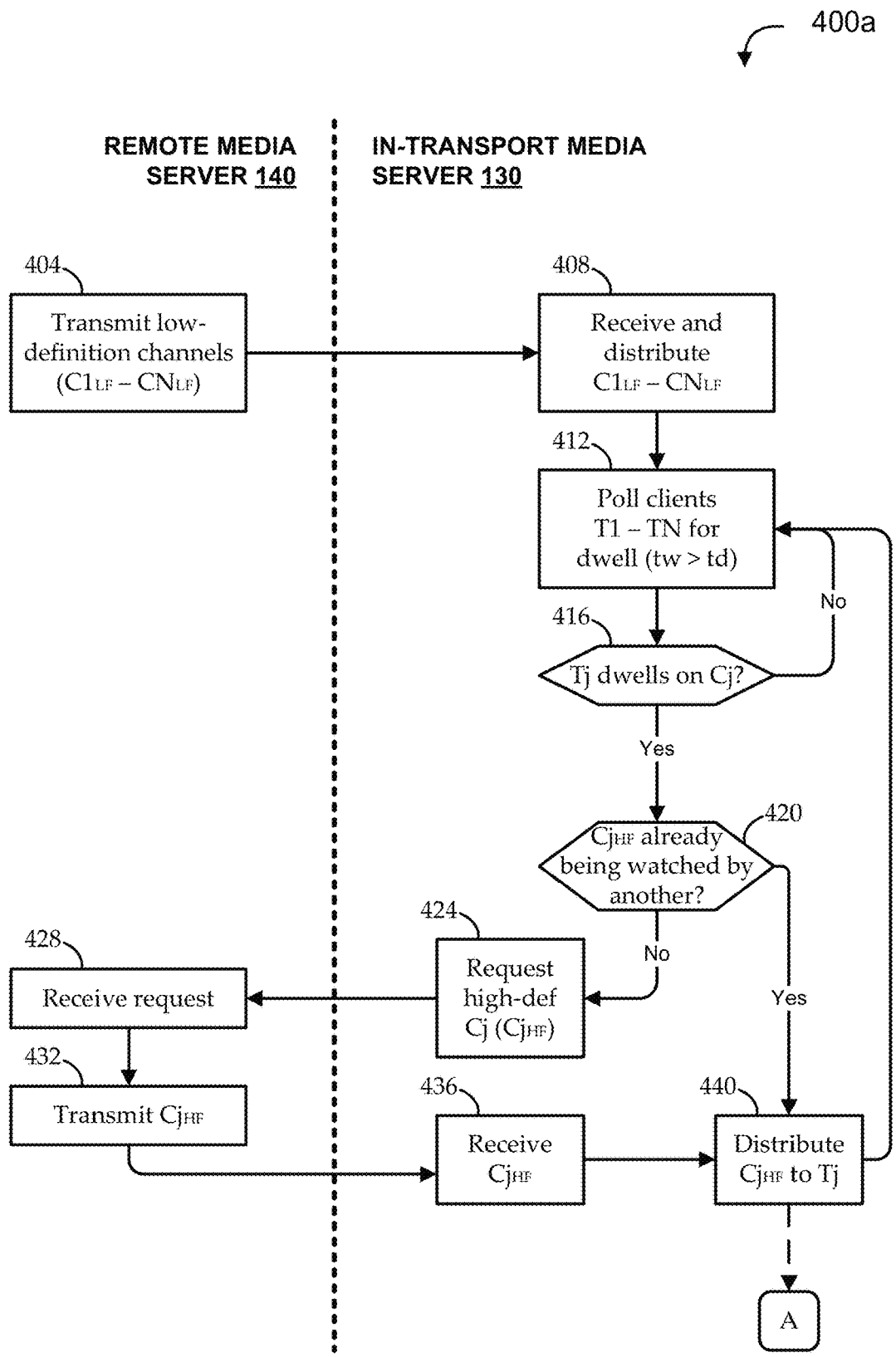
FIGS. 4A and 4B show a more detailed flow diagram for an illustrative method for efficient delivery of multiple channels of media in transport, according to various embodiments.
Figure 4B:
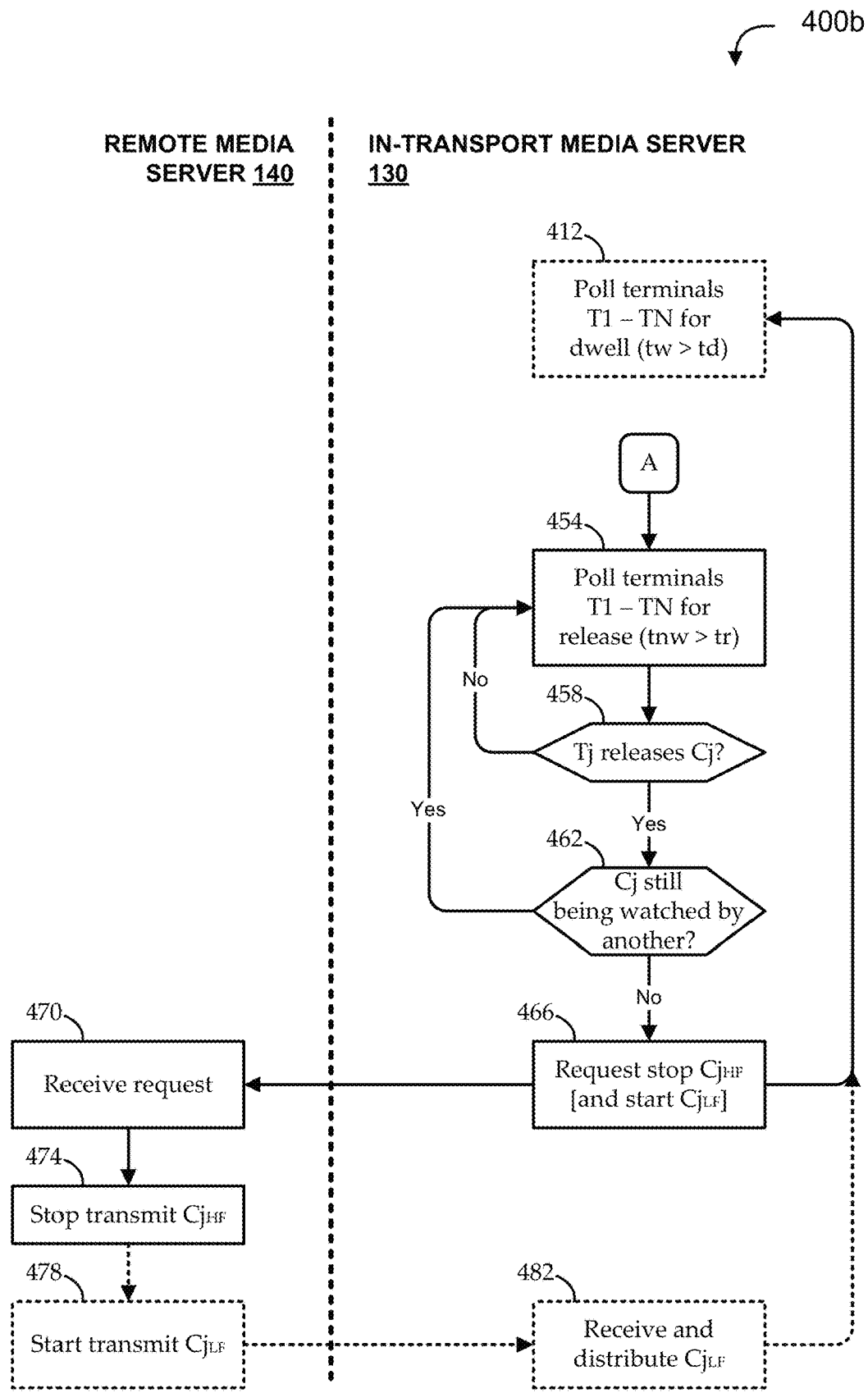

FIGS. 4A and 4B show a more detailed flow diagram for an illustrative method 400 for efficient delivery of multiple channels of media in transport, according to various embodiments. Embodiments of the method 400 begin at stage 404 with the remote media server 140 communicating low-fidelity instances of N channels ("$C1_{LF}$-$CN_{LF}$"). At stage 408, in-transport media server 130 can receive and distribute $C1_{LF}$-$CN_{LF}$ to in-transport media clients. At stage 412, the in-transport media server 130 can poll (or otherwise monitor) the in-transport media clients to determine channel listing interactions. At stage 416, a determination is made as to whether any in-transport media client (Tj) has dwelled on any of the channel offerings (Cj) for at least a dwell duration (e.g., "tw>td"). If not, embodiments can continue to poll the clients at stage 412 until a dwell is detected.

At stage 420, a further determination can be made as to whether a high-fidelity instance of the channel offering ($Cj_{HF}$) is presently being watched by any other in-transport media clients. Some embodiments can proceed differently, depending on whether any channel offerings are presently being consumed. For example, in some implementations, the determination is made at stage 420, regardless of the state of channel consumption; while, in other implementations, a dedicated state can be included for when no channels are being watched by any clients. In such a dedicated state, the determination at stage 420 is necessarily "no," so that the method 400 can always proceed from stage 416 to stage 424 when in this dedicated state (i.e., without the additional determination at stage 420). If the determination at stage 420 is "yes", the high-fidelity instance of the channel offering ($Cj_{HF}$) is already being received by the in-transport media server 130, and that instance can be distributed to the requesting in transport media client (Tj), accordingly (i.e., without a further request to the remote media server 140). If no other clients are presently consuming the $Cj_{HF}$ (e.g., and/or it is otherwise determined that $Cj_{HF}$ is not already being received by the in-transport media server 130), $Cj_{HF}$ can be requested from the remote media server 140 at stage 424. The request can be received by the remote media server 140 at stage 428, and the remote media server 140 can begin communicating $Cj_{HF}$ to the in-transport media server 130, accordingly, at stage 432. $Cj_{HF}$ can be received by the in-transport media server 130 at stage 436 and distributed to the requesting client (Tj) at stage 440.

Embodiments of the method 400 continue with FIG. 4B, as indicated by reference block "A". FIG. 4B shows stage 412 and reference block "A" for the sake of context in relation to FIG. 4A. Embodiments continue at stage 454 with the in-transport media server 130 polling (or otherwise monitoring) the channel listing interactions of the in-transport media clients for channel release. At stage 458, a determination is made as to whether any in-transport media client (Tj) has released any of the channel offerings (Cj) for at least a release duration (e.g., "tnw>tr"). If not, embodiments can continue to poll the clients at stage 454 until a release is detected.

If a channel release is detected at stage 454, embodiments can further determine, at stage 462, whether any other in-transport media client is still consuming that channel offering. If so, embodiments can effectively take no action, so that the high-fidelity instance can still be available for any in-transport media client still consuming that channel offering (e.g., embodiments can return to stage 454 to continue polling for channel release). If no other clients are still consuming the channel offering, it can be desirable to stop receiving the high-fidelity instance of that channel offering (i.e., to save bandwidth). For example, the same high-fidelity or low-fidelity channel can be distributed to, and/or consumed by, one or more clients concurrently (e.g., twenty passengers on an airplane may be watching the same channel); and the channel can be considered as no longer being consumed only when the number of consuming clients drops to zero.

Accordingly, at stage 466, a request can be made to the remote media server 140 to stop communicating the high-fidelity instance (e.g., and further to start communicating a respective low-fidelity instance, for example, if it is not already being communicated, or if the remote media server 140 does not automatically do that in response to stopping communication of the high-fidelity instance). At stage 470, the remote media server 140 can receive the request. In response, the remote media server 140 can stop communicating the high-fidelity instance at stage 474, and, in some embodiments, can begin transmitting (e.g., or can continue transmitting) the low-fidelity instance at stage 478. In some embodiments, the in-transport media server 130 can receive the low-fidelity instance at stage 482 and distribute it when the channel offering is subsequently requested by an in-transport medial client. Embodiments can once again poll clients for channel dwell at stage 412, for example, to determine whether any clients subsequently begin to consume the channel.

Figure 5:
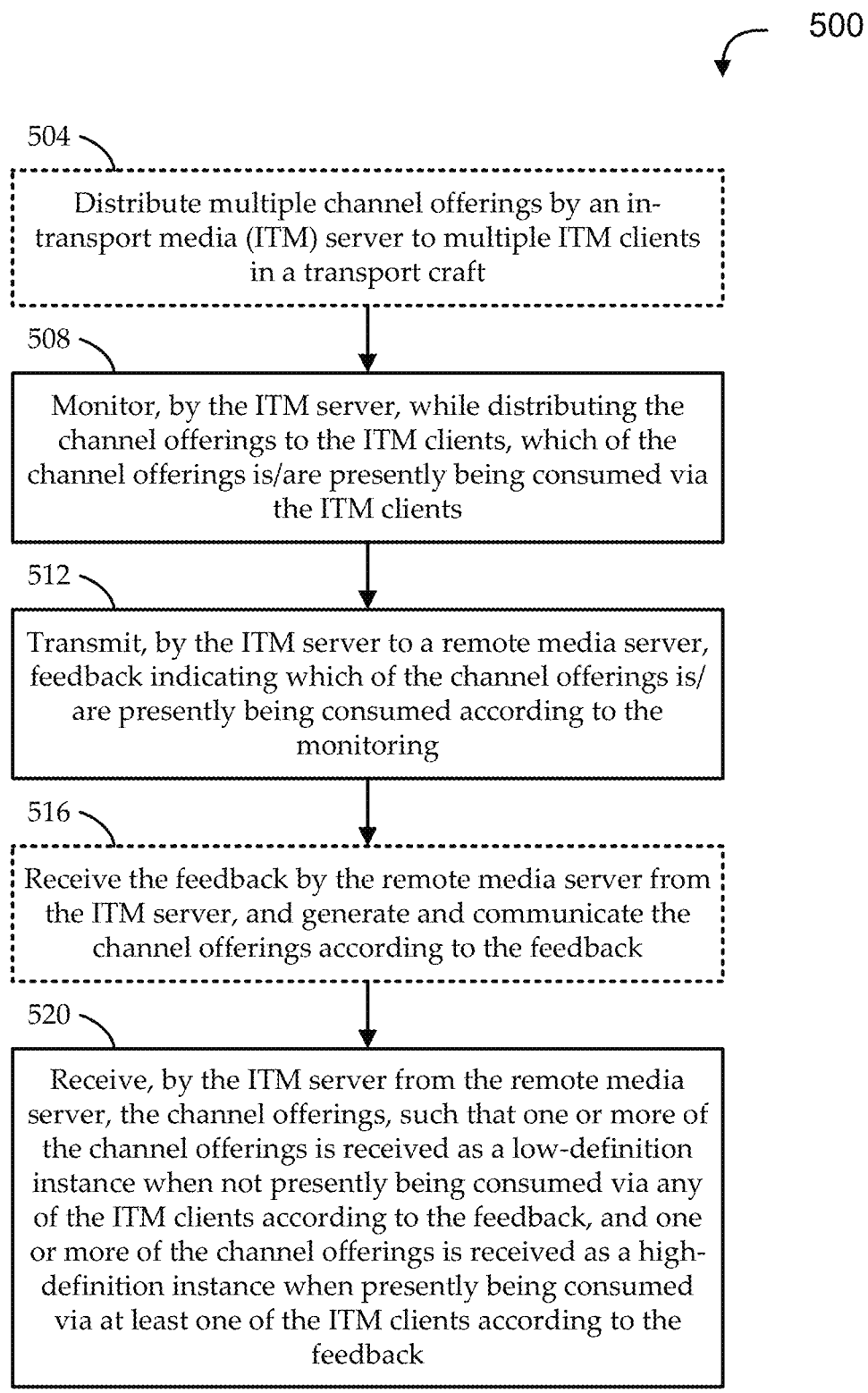
FIG. 5 shows a flow diagram of an illustrative method for distribution of media channel offerings in an in-transport communications system, according to various embodiments.

FIG. 5 shows a flow diagram of an illustrative method 500 for distribution of media channel offerings in an in-transport communications system, according to various embodiments. Some embodiments of the method 500 can begin at stage 504 by using an in-transport media (ITM) server to distribute multiple channel offerings to multiple ITM clients in a transport craft. For example, as described above, multiple passengers on a transport craft (e.g., an airplane, train, bus, cruise ship, etc.) desire to consume media through one or more media consumption devices that are integrated with the transport craft (e.g., seatback terminals installed on the craft) and/or personal devices of the passenger (e.g., a smart phone, portable computer, etc.). The ITM server is also located on the transport craft and is in communication with the ITM clients (e.g., via wired and/or wireless communications links).

At stage 508, the ITM server can monitor which of the channel offerings are presently being consumed via the ITM clients while the channel offerings are being distributed to the ITM clients. For example, the ITM server can monitor how many, if any, clients are tuned to particular channel offerings and/or whether they have remained tuned to or tuned away from particular channels for threshold durations (i.e., dwell and/or release threshold durations). Some implementations of the ITM server can also monitor characteristics of the ITM clients (e.g., display characteristics and/or other characteristics of the ITM clients consuming particular channels), etc.

At stage 512, embodiments of the ITM server can transmit, to a remote media server, feedback indicating which of the channel offerings are presently being consumed according to the monitoring at stage 508. The remote media server can be in communication with the transport craft, and thereby with the ITM server, via any suitable communications network, such as a satellite communications network. For example, the remote media server can be located in, or in communication with, a satellite ground station (e.g., a gateway or core node). The feedback can include any suitable information indicating the consumption status of the channel offerings. For example, the feedback can include a consumption status (e.g., presently consumed or not, types of ITM clients consuming, etc.) for each channel offering, a list of which channel offerings are presently being consumed, a list of channel offerings not presently being consumed, explicit requests for particular channel offerings (e.g., at a particular fidelity), etc.

In some embodiments, at stage 516, the feedback can be received by the remote media server from the ITM server, and the remote video server can generate and communicate the channel offerings according to the feedback. For example, the remote media server can generate high-fidelity and/or low-fidelity instances for each channel offering. As described above, the relative fidelities can be determined and generated in any suitable manner. In some implementations, one or more linear video streams (e.g., linear broadcast video, such as Internet protocol television, IPTV) are received by the remote media server from a network (e.g., the Internet) as the high-fidelity instances of the channel offerings, and the high-fidelity instance can be down-converted in one or more ways to generate the low-fidelity instance. For example, one implementation generates a periodic snapshot image (e.g., every half-second) of the linear broadcast video stream and compresses the snapshot images to form the low-fidelity instance.

At stage 520, embodiments of the method 500 can receive the channel offerings, by the ITM server from the remote media server, in accordance with the feedback. The channel offerings can be received in such a way that one or more of the channel offerings is received as a low-fidelity instance when not presently being consumed via any of the ITM clients according to the feedback, and one or more of the plurality of channel offerings is received as a high-fidelity instance when presently being consumed via at least one of the ITM clients according to the feedback. In some implementations, a low-fidelity instance is received even for some or all of the channel offerings that are presently being consumed. In other implementations, no instance is received for some of the unwatched channel offerings.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. An in-transport media (ITM) delivery system comprising:
    a plurality of ITM distribution servers disposed in respective ones of a plurality of transport crafts, the plurality of transport crafts each being in communication with a remote media server via a shared communication link comprising a carrier frequency of a spot beam of a satellite communication system, the plurality of ITM distribution servers each comprising:
        a request controller to monitor a plurality of ITM clients disposed in the transport craft to aggregate requests from the plurality of ITM clients for a plurality of media channel offerings;
        a communications controller to:
            communicate, to the remote media server, feedback indicating requested media channel offerings that are presently being requested according to the monitoring, and receive from the remote media server via a multicast over the shared communication link a first plurality of media channels at a relatively higher fidelity and a second plurality of media channels at a relatively lower fidelity, wherein the first plurality of media channels and the second plurality of media channels are based on the feedback from the plurality of ITM distribution servers, the first plurality of media channels corresponding to a first aggregation of the requested media channel offerings of each of the plurality of ITM distribution servers and the second plurality of media channels corresponding to a second aggregation of adjacent media channel offerings outside of and adjacent to the first aggregation of the requested media channel offerings of each of the plurality of ITM distribution servers, wherein instances of unwatched media channel offerings of the plurality of media channel offerings outside the first aggregation and the second aggregation are not communicated to or received at any of the plurality of ITM distribution servers; and a channel distribution controller to distribute, for each of the requested media channel offerings, a respective instance of the requested media channel offering to each of the ITM clients that is presently requesting the media channel offering according to the monitoring.

2. The ITM delivery system of claim 1, wherein the second aggregation comprises at least one media channel offering adjacent to a lower bound of the first aggregation and at least another media channel offering adjacent to an upper bound of the first aggregation.

3. The ITM delivery system of claim 1, wherein the transport craft is an airplane.

4. The ITM delivery system of claim 1, wherein the request controller determines that one of the media channel offerings is presently being requested by detecting that at least one of the ITM clients has been tuned to the media channel offering for at least a predetermined threshold dwell duration.

5. The ITM delivery system of claim 1, wherein the request controller determines that one of the media channel offerings is presently not being requested by detecting that none of the ITM clients has been tuned to the media channel offering for at least a predetermined threshold release duration.

6. The ITM delivery system of claim 1, wherein:
the request controller further monitors the plurality of ITM clients to determine, for each of the requested media channel offerings in the first aggregation, an associated highest fidelity supported by the plurality of ITM clients requesting the media channel offering from any of the plurality of ITM distribution servers;
the communications controller further communicates the feedback to indicate the associated highest fidelity for each of the requested media channel offerings in the first aggregation; and
the communications controller further receives the first plurality of media channels according to the associated highest fidelity of the plurality of ITM clients of the plurality of ITM distribution servers.

7. The ITM delivery system of claim 1, wherein:
the communications controller further communicates the feedback to indicate a present link quality of a communications link over which traffic is received by the communications controller; and
the communications controller further receives at least some of the requested media channel offerings at a fidelity corresponding to the present link quality.

8. The ITM delivery system of claim 1, wherein the communications controller further receives requested Internet traffic via the communications network in response to requests for the Internet traffic originating from a requesting one of the ITM clients.

9. The ITM delivery system of claim 1, wherein each of at least a portion of the media channel offerings comprises linear programming.

10. The ITM delivery system of claim 1, further comprising:
the plurality of ITM clients, each communicatively coupled with the ITM distribution server.

11. The ITM delivery system of claim 1, further comprising:
the remote media server communicatively coupled with the plurality of ITM distribution servers.

12. The ITM delivery system of claim 1, wherein the requested media channel offerings and the at least one adjacent media channel offering comprise less than all the instances of media channel offerings.

13. A method for distribution of media channel offerings in an in-transport communications system, the method comprising:
monitoring, by each of a plurality of in-transport media (ITM) servers disposed in respective ones of a plurality of transport crafts, a plurality of ITM clients disposed in the respective ones of the plurality of transport crafts to aggregate requests from the plurality of ITM clients for a plurality of requested media channel offerings, the plurality of ITM servers of the plurality of transport crafts each being in communication with a remote media server via a shared communication link comprising a carrier frequency of a spot beam of a satellite communication system;
transmitting, from each of the plurality of ITM servers to a remote media server via a communications network, feedback indicating requested media channel offerings that are presently being requested according to the monitoring;
receiving, by the plurality of ITM servers from the remote media server via a multicast over the shared communication link, a first plurality of media channels at a relatively higher fidelity and a second plurality of media channels at a relatively lower fidelity, wherein the first plurality of media channels and the second plurality of media channels are based on the feedback from the plurality of ITM distribution servers, the first plurality of media channels corresponding to a first aggregation of the requested media channel offerings of each of the plurality of ITM distribution servers and the second plurality of media channels corresponding to a second aggregation of adjacent media channel offerings outside of and adjacent to the first aggregation of the requested media channel offerings of each of the plurality of ITM distribution servers, and wherein instances of media channel offerings outside the first aggregation and the second aggregation are not received at any of the plurality of ITM distribution servers; and
distributing, by each of the plurality of ITM distribution servers for each of the requested media channel offerings, a respective instance of the requested media channel offering to each of the ITM clients that is presently requesting the media channel offering according to the monitoring.

14. The method of claim 13, wherein the second aggregation comprises at least one media channel offering adjacent to a lower bound of the first aggregation and at least another media channel offering adjacent to an upper bound of the first aggregation.

15. The method of claim 13, wherein each of at least a portion of the requested media channel offerings comprises linear programming.

16. The method of claim 13, wherein the requested media channel offerings and the at least one adjacent media channel offering comprise less than all the instances of media channel offerings.

* * * * *